(12) United States Patent
Desai et al.

(10) Patent No.: US 8,511,145 B1
(45) Date of Patent: Aug. 20, 2013

(54) EXPLOSIVE EVENT DISCRIMINATION

(75) Inventors: Sachi Desai, Franklin, NJ (US); Myron Hohil, Montville, NJ (US); Amir Morcos, Parsippany, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 917 days.

(21) Appl. No.: 12/553,175

(22) Filed: Sep. 3, 2009

(51) Int. Cl.
*G01N 33/22* (2006.01)
*G01S 3/80* (2006.01)
*G06F 15/18* (2006.01)
*G06G 7/02* (2006.01)

(52) U.S. Cl.
USPC ............. 73/35.14; 706/20; 706/15; 367/906; 367/907

(58) Field of Classification Search
USPC ............. 73/35.14, 432.1; 367/124, 127–129, 367/906, 907; 706/15, 20; 102/293
See application file for complete search history.

(56) References Cited

U.S. PATENT DOCUMENTS

| | | | | |
|---|---|---|---|---|
| 5,140,329 | A * | 8/1992 | Maughan et al. | 342/67 |
| 5,631,654 | A * | 5/1997 | Karr | 342/107 |
| 5,973,998 | A * | 10/1999 | Showen et al. | 367/124 |
| 6,847,587 | B2 * | 1/2005 | Patterson et al. | 367/127 |
| 6,914,854 | B1 * | 7/2005 | Heberley et al. | 367/119 |
| 7,203,132 | B2 * | 4/2007 | Berger | 367/129 |
| 7,233,936 | B1 * | 6/2007 | Muller et al. | 706/52 |
| 7,409,374 | B1 * | 8/2008 | Hohil et al. | 706/20 |
| 8,106,814 | B2 * | 1/2012 | Durand et al. | 342/113 |
| 2003/0167153 | A1 * | 9/2003 | Alexander | 702/189 |
| 2008/0165621 | A1 * | 7/2008 | Fisher et al. | 367/118 |
| 2011/0252683 | A1 * | 10/2011 | Chedid et al. | 42/1.03 |

\* cited by examiner

*Primary Examiner* — Helen Kwok
(74) *Attorney, Agent, or Firm* — Henry S. Goldfine

(57) ABSTRACT

A computer implemented method for discriminating between launch and impact events using acoustic sensors.

1 Claim, 11 Drawing Sheets

EXPLOSIVE EVENT DISCRIMINATION

U.S. GOVERNMENT INTEREST

The inventions described herein may be manufactured, used and licensed by or for the U.S. Government for U.S. Government purposes.

FIELD OF THE DISCLOSURE

This disclosure relates generally to the detection and discrimination of explosive events. More particularly, it pertains to a method that uses acoustic sensors to discriminate between explosive events associated with the launching of artillery or mortar projectiles and explosive events associated with the impact (detonation) of artillery or mortar projectiles.

BACKGROUND OF THE DISCLOSURE

As can be readily appreciated, the ability to readily discriminate between the launching and impact of explosive projectiles is of great significance in a battlefield environment. More particularly, such a discriminatory ability increases an overall situational awareness for a field commander while reducing a "fog of war" effect so common in military active battlefield environments.

SUMMARY OF THE DISCLOSURE

An advance is made in the art according to an aspect of the present disclosure directed to a computer-implemented method utilizing an acoustic sensor to determine whether an acoustically detected explosive event was caused by a launch of a projectile of an impact/explosion/detonation of the explosive projectile. Such projectiles encompass small arms armament, indirect fire armament and direct fire armament which can be expelled via an explosive event or detonated via an explosive event or have the capacity for both.

BRIEF DESCRIPTION OF THE DRAWING

A more complete understanding of the present disclosure may be realized by reference to the accompanying drawings in which.

DETAILED DESCRIPTION

Figure 1:
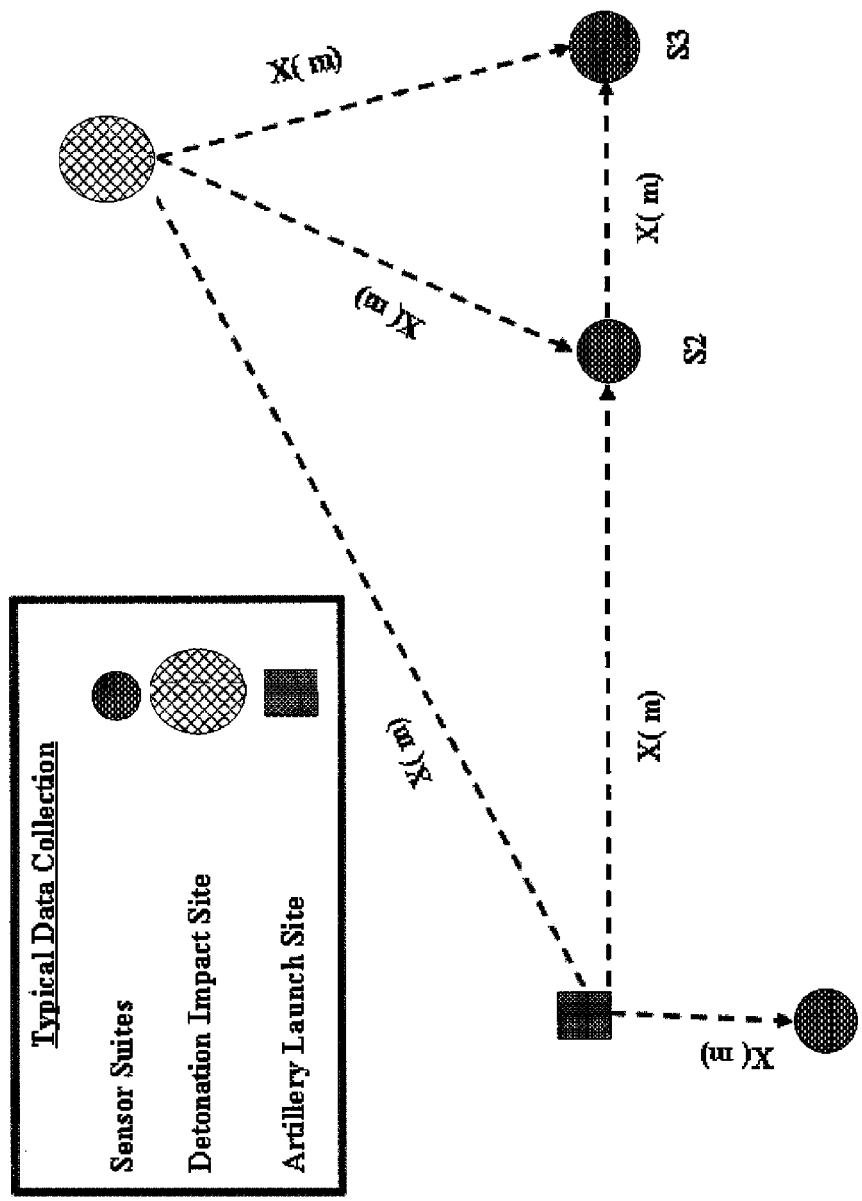
FIG. 1 is a schematic diagram of an exemplary experimental configuration of artillery/sensors/impact point and collection points according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

As noted, one aspect of the present disclosure is the use of acoustic sensors in conjunction with signal-processing techniques to discriminate explosive events as originating from either launch (LA) or impact (IM) of mortars/artillery or the like. A representative experimental configuration is shown schematically in FIG. 1. More particularly, an artillery/mortar launch and impact site is shown along with a data collection site and a number of acoustic sensor sites.

Notably, a launch (LA) event is conveniently defined as occurring when a projectile contained within a confined space is expelled via an explosive event thereby propelling the projectile. As can be readily appreciated, this definition of launch event encompasses bullets fired from small arms, indirect events such as mortars when initially fired as well as direct fire events such as artillery when fired.

An impact (IM) event—for example—is an explosion for the purpose of generating a concussive blast or releases material(s). As can be appreciated, one significant difference between a LA or IM event is that with an IM event a projectile is not substantially constrained thereby allowing for a substantially omni-directional expansion of the event (if so desired). Generally, with a LA such explosion is both controlled and directed to a single direction thereby facilitating the propulsion/expulsion of said projectile. With an IM, the explosion is generally unconstrained and limited only by the type and amount of explosive material contained within the projectile. A IM encompasses all direct and indirect fire that either through proximity fuze, impact fuze, timer fuze or other detonation method is urged to explode. Stated very generally, a LA expels a projectile, an IM is produced when that projectile detonates upon impact or fuze or other mechanism.

As can be appreciated, the scenario depicted in FIG. 1 is but one of many iterations and implementations of acoustic sensors possible with our inventive disclosure. Furthermore, the method and algorithm according to the present disclosure may work in a standalone configuration—as presently described—with a single microphone/acoustic sensor. Our method is not so specifically limited as it may be readily enhanced to accommodate multiple acoustic sensors.

Figure 2:
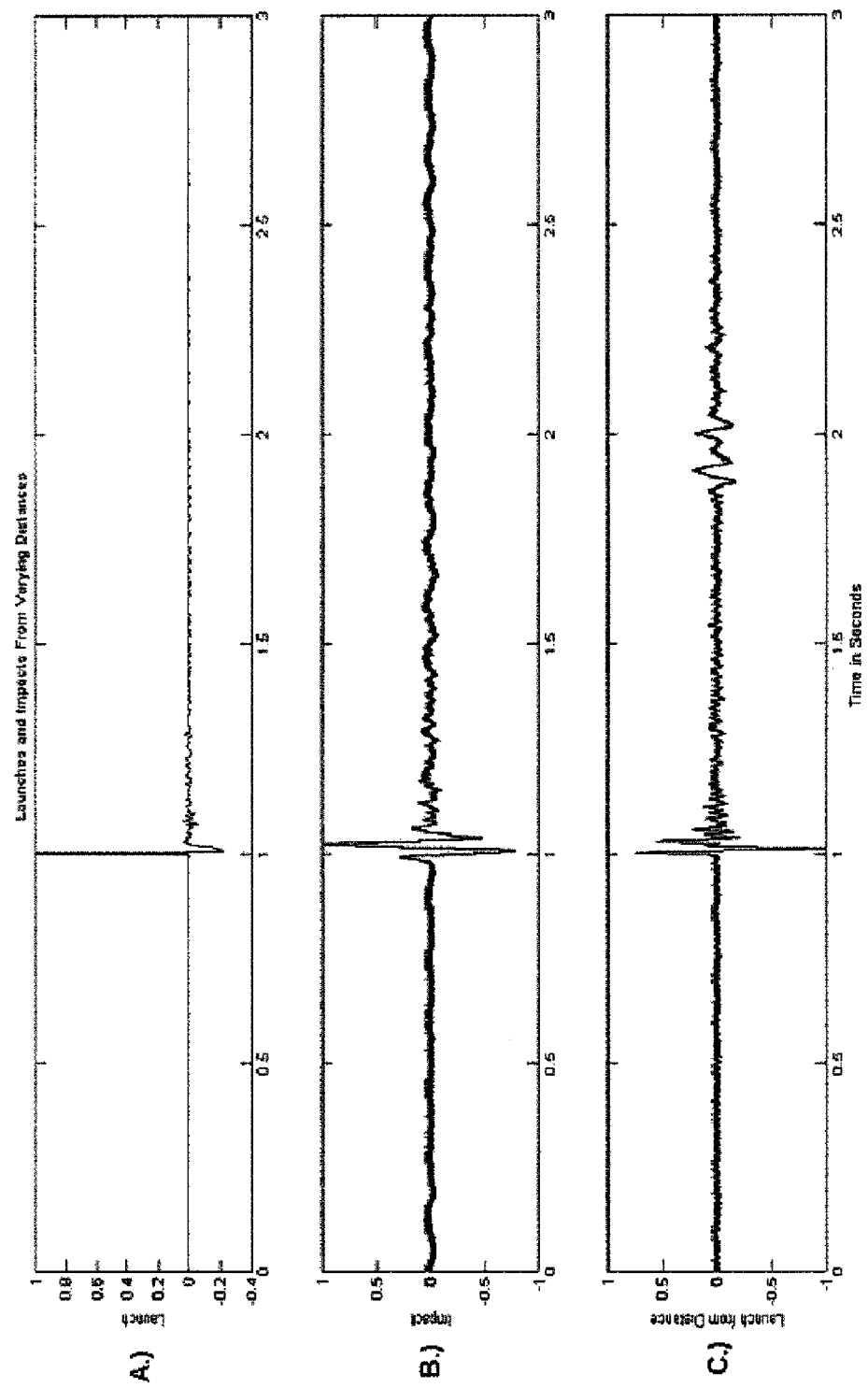
FIG. 2 is a series of graphs of normalized pressure vs. time depicting acoustic signatures from a site showing (a) 81 mm launch; (b) 81 mm impact; and (c) 81 mm launch at greater distance.

FIG. 2 shows the graphs of three representative high quality acoustic signatures FIG. 2(a), FIG. 2(b) and FIG. 2(c) for launch (LA) and impact (IM) events as detected by the sensors positioned at various distances from the explosive event. Notably, the placement of sensors is to collect a representative data set from various distances and acoustic scene aspects to ensure that different acoustic attenuation patters were considered for our purposes herein. In these graphs, the amplitude of the signatures has been normalized.

More particularly, high frequency precursors that occur prior to a main blast of an IM type event are shown in FIG. 2(b). These precursors attributed to various explosive (i.e. supersonic shrapnel) and concussive properties within the blast, which degrade during longer-range propagation. Note that these high frequency precursors are absent prior to the main blast as shown in FIG. 2(a), and FIG. 2(c). As will become apparent to those skilled in the art, methods according to the present disclosure are the first to employ these characteristics at distance and use it via acoustic sensor.

As we shall show and according to an aspect of the present disclosure, we advantageously exploit these range invariant features found within a multi-resolution decomposition of the corresponding signatures to reliably discriminate between event types resulting from a variety of artillery at varying ranges.

By way of some additional background, we begin by noting that our inventive method employs wavelets—which are oftentimes used for image-based signal processing. As we shall describe however, wavelets are used in the present method to extrapolate information from temporal based events and more particularly to identify distinct, disjoint feature sets that remain consistent for a given class of artillery or other round, and which do not generally degrade dramatically with a long-range propagation.

As may be appreciated by those skilled in the art, such complex, non-stationary signatures are categorically poor candidates for feature extraction and segmentation via Fourier analysis or the short-time Fourier Transform. On the other hand, the non-stationary, transient, and often oscillatory natures of these signals may be advantageously well represented with wavelet bases that effectively capture the time frequency distribution of such signal components. As we shall demonstrate, wavelets are well suited for analyzing transient signals, as they are well localized in time and in frequency, and are able to accommodate the scale of multiple signal components.

For our purposes, the wavelet transform advantageously can provide a scalable time-frequency representation of artillery blast signatures and can uncover details that are not readily found using conventional signal processing techniques. More particularly, noise components introduced into the blast waves—prior to their receipt at a sensor—are a significant impediment to identifying and isolating features that facilitate the characterization of the signal.

Advantageously, by employing wavelets in a multiresolution analysis, the present method removes this noise from the baseband signal of interest; a process referred to as wavelet denoising. This wavelet denoising is optimal in the sense that noise components are removed from the signal components regardless of the frequency content of the signal, which is quite efficient as compared to conventional filtering methods that retain baseband signal components and suppress high frequency noise.

Of particular importance, the wavelet transform allows us to take advantage of these concepts via the introduction of a powerful data analysis tool afforded by the discrete wavelet transform. As a result, appropriate feature extraction thus becomes possible. In particular, our utilization of the Daubechies family of wavelets, specifically the db4 and db7, allows a strong feature space to be developed with our method.

Figure 3:
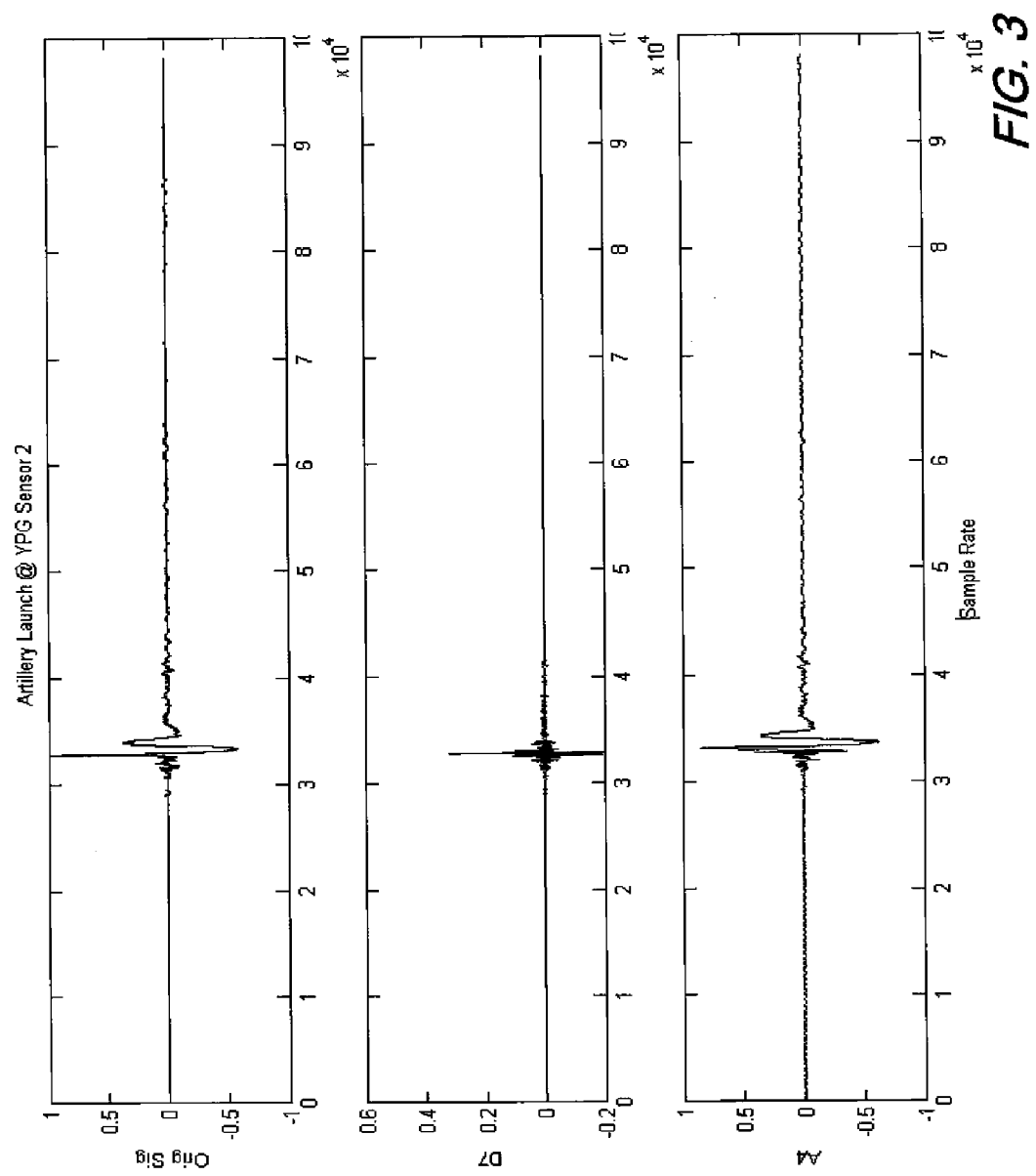
FIG. 3 is a series of graphs of normalized pressure vs. time depicting artillery impact signal and wavelet decomposition using db7 and db4 to produce details at level 7 and approximation coefficients from sensor S2 of FIG. 1.
Figure 4:
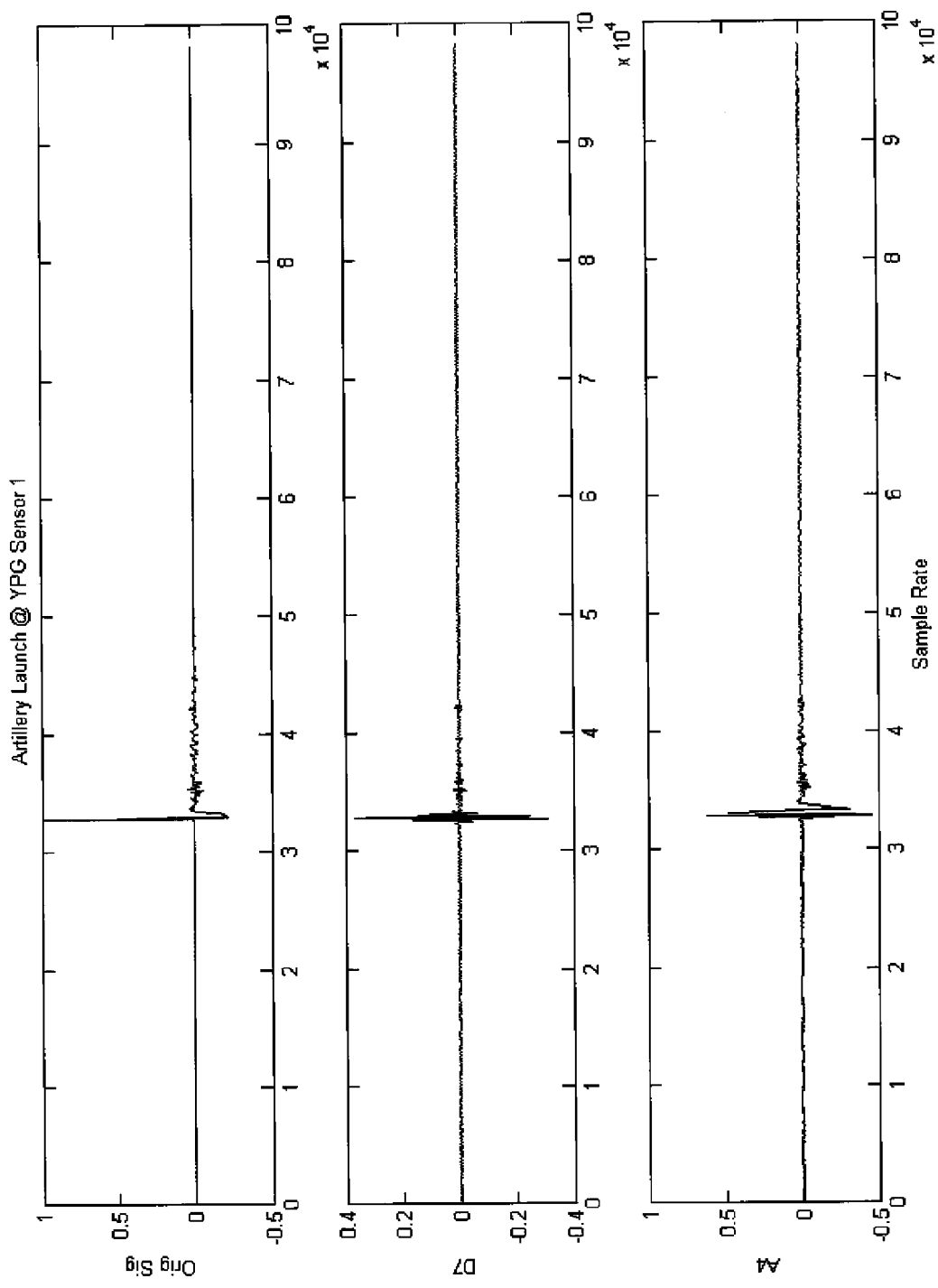
FIG. 4 is a series of graphs of normalized pressure vs. time depicting artillery launch and wavelet decomposition using db7 and db4 to produce details at level 7 and approximation coefficients at level 4 from sensor S2 of FIG. 1.

The discrete wavelet transform information is extrapolated through the effect of Mallet's theorem. Mallet's theorem advantageously allows us to perform a multiresolutional analysis of the acoustic signature and maintain temporal space with great resolution. Such resolution provides information needed to characterize a given class of acoustic signatures particularly in distinguishing events as either Launch/Impact of a normalized pressure wave against time such as those shown in FIG. 3 and FIG. 4.

With our inventive method, the feature space developed is comprised of primitives derived from the normalized energy distributions within the details at level 7 and the normalized original signature, centered about the maximum value of the blast wave that results in various power distributions characteristic to the event. In addition, other features are obtained from frequency components derived using a db4 wavelet decomposition. Features such as the rise time for the blast wave and the low frequency content found within the acoustic signals is least attenuated over long propagation distances when compared to some of the predominant features initially identified for discrimination.

As may be appreciated, feature extraction yields differences that become visible with the varying energy distribution found within the events, including the energy distributions within the precursors of an impact event that are typically absent within launch events. Furthermore, these features are not amplitude dependant as the baseband normalized with the scaling function and only the high-frequency noise components extracted.

Figure 5:
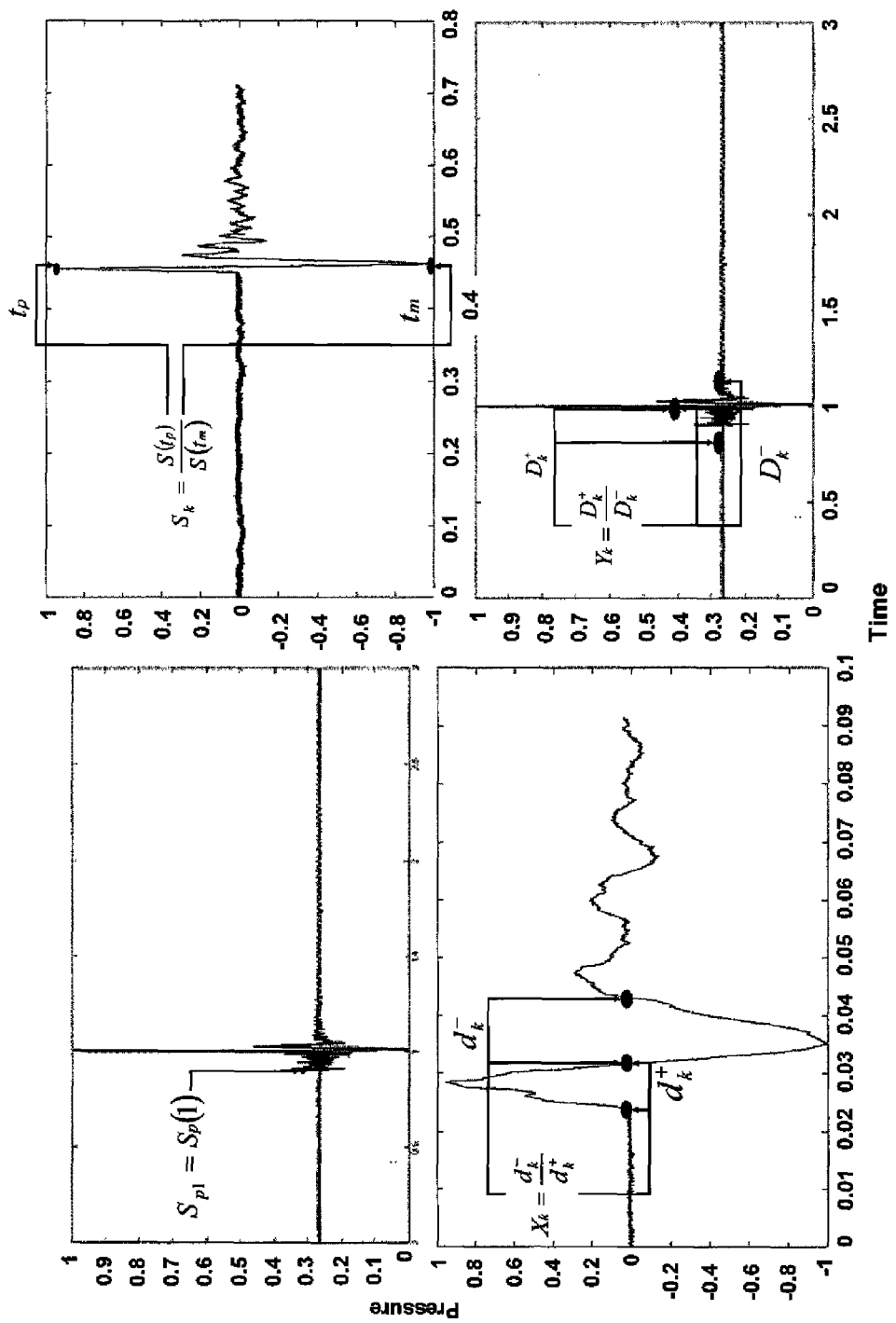
FIG. 5 is a series of graph segments showing the physical representation of extracted features via signal processing according to the present invention.
Figure 6:
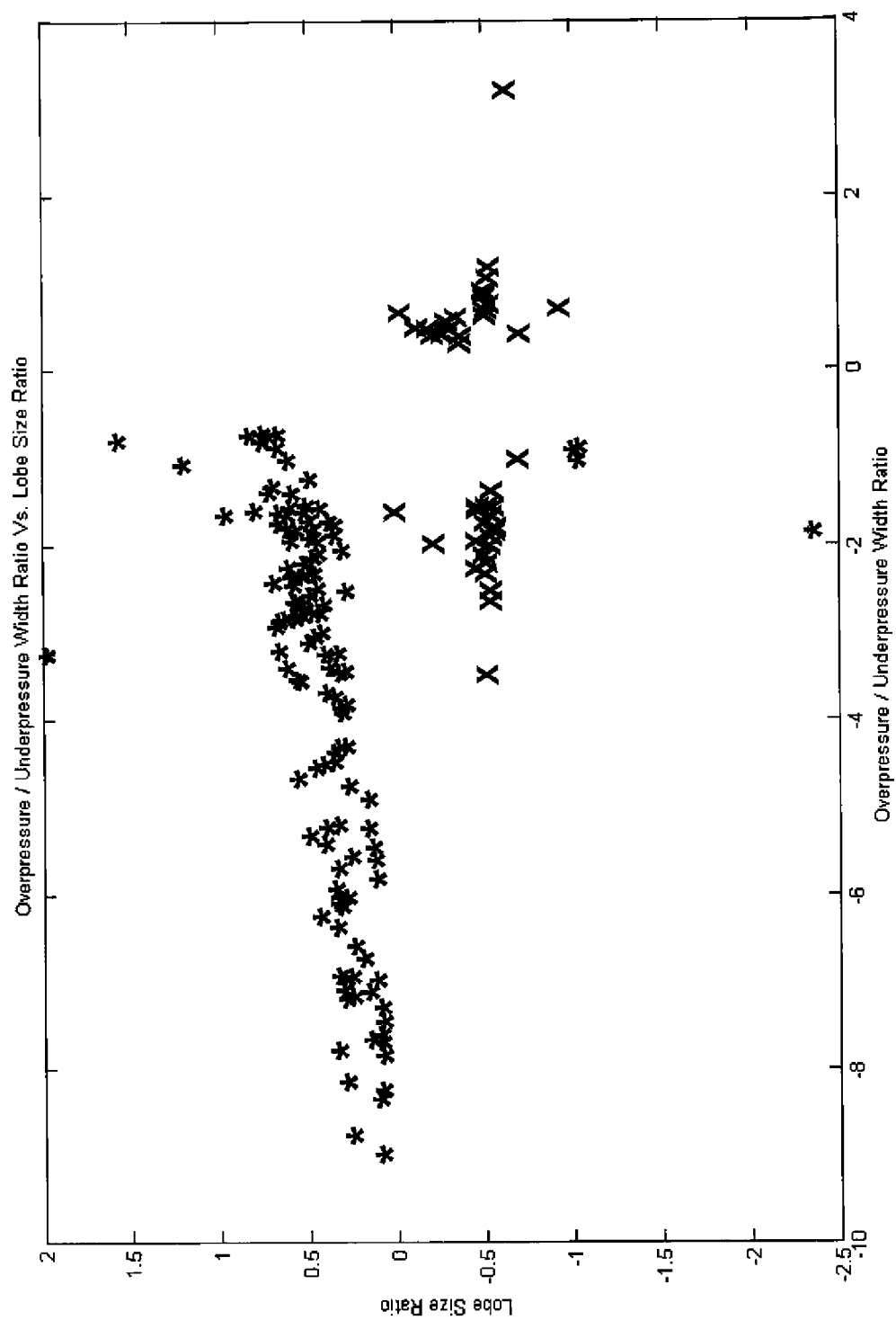
FIG. 6 is a graph showing 2D feature spaces derived from site Alpha.

FIG. 5 is a graph showing physical representation of extracted features via signal processing. FIG. 6 shows the 2D feature spaces derived from site Alpha data. An 'X' is used to indicate features derived from an impact event while the corresponding launch event feature points are depicted with an 'o'. Note that the resulting subspaces reveal a high degree of separation indifferent to the large variability in ranges of acoustic sensor to event of interest. Advantageously, these extracted features show potential for discrimination and high separability of event types through the use of a neural network.

As may be readily appreciated by those skilled in the art, neural networks have proven to be a powerful tool for solving difficult classification (mapping) problems while demonstrating the ability to realize non-linear discriminant functions and complex decision regions that are often required to ensure separability between classes. Fortunately for our purposes, the use of neural networks for classification is well documented and convergence requirements for training are well known in the art.

According to an aspect of our invention, a standard multi-layer feed-forward neural network may be used due—in part—to its ability to learn mappings of any complexity. The neural network classifier used to discriminate between LA and IM artillery blasts may be trained using the generalized "delta rule" or back propagation algorithm. This algorithm sequentially adjusts the interconnection weights within the network, subsequent to the application of all patterns in a training set, a routine commonly referred to as an epoch. In a representative evaluation, the neural network employed utilized the 6-tuple vector denoting the extracted feature space based on a data analysis conducted previously. The results of feature extraction provide a classification reliability of approximately 85.5%.

Figure 7:
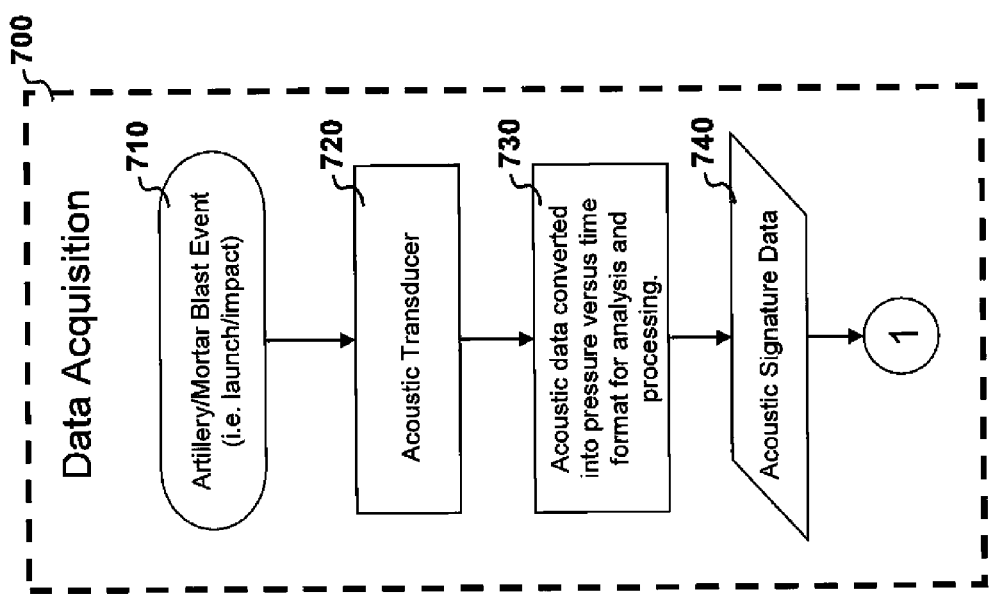
FIG. 7 is a flowchart showing data acquisition steps associated with a method according to the present disclosure.

With these operational aspects in place, we may now describe the particular steps associated with event discrimination according to the present invention. With reference to the flow chart shown in FIG. 7, we now describe the specific set of steps employed to discriminate artillery blast events using a single modal acoustic sensor.

As shown, the flow chart is meant to provide an outline of steps of how the data is processed and how specific algorithms are used to create unique attributes that are utilized to discriminate an explosive event via an acoustic signature. Advantageously, the method can be applied using seismic sensors that measure blast waves coupled into the ground. In general, arbitrary trained classifier could be employed to accommodate the discrimination and classification capability that is specifically designated by a neural network specified herein.

With reference now to that FIG. 6, an artillery blast event occurs (step 710) which is generally an explosive acoustical event resulting from either an impact detonation or a launch explosion which expels a round. Such an event emits characteristic acoustics.

An acoustic transducer (step 720) detects the acoustics resulting from the artillery blast event and the detected acoustic signature information is recorded. The acoustic data is recorded into a format readily acceptable as a 1×n matrix that is then is put into pressure (Pa) vs. time to allow for comparable analysis (step 730). The stored data is the acoustic signature data of the artillery blast (step 740).

Figure 8:
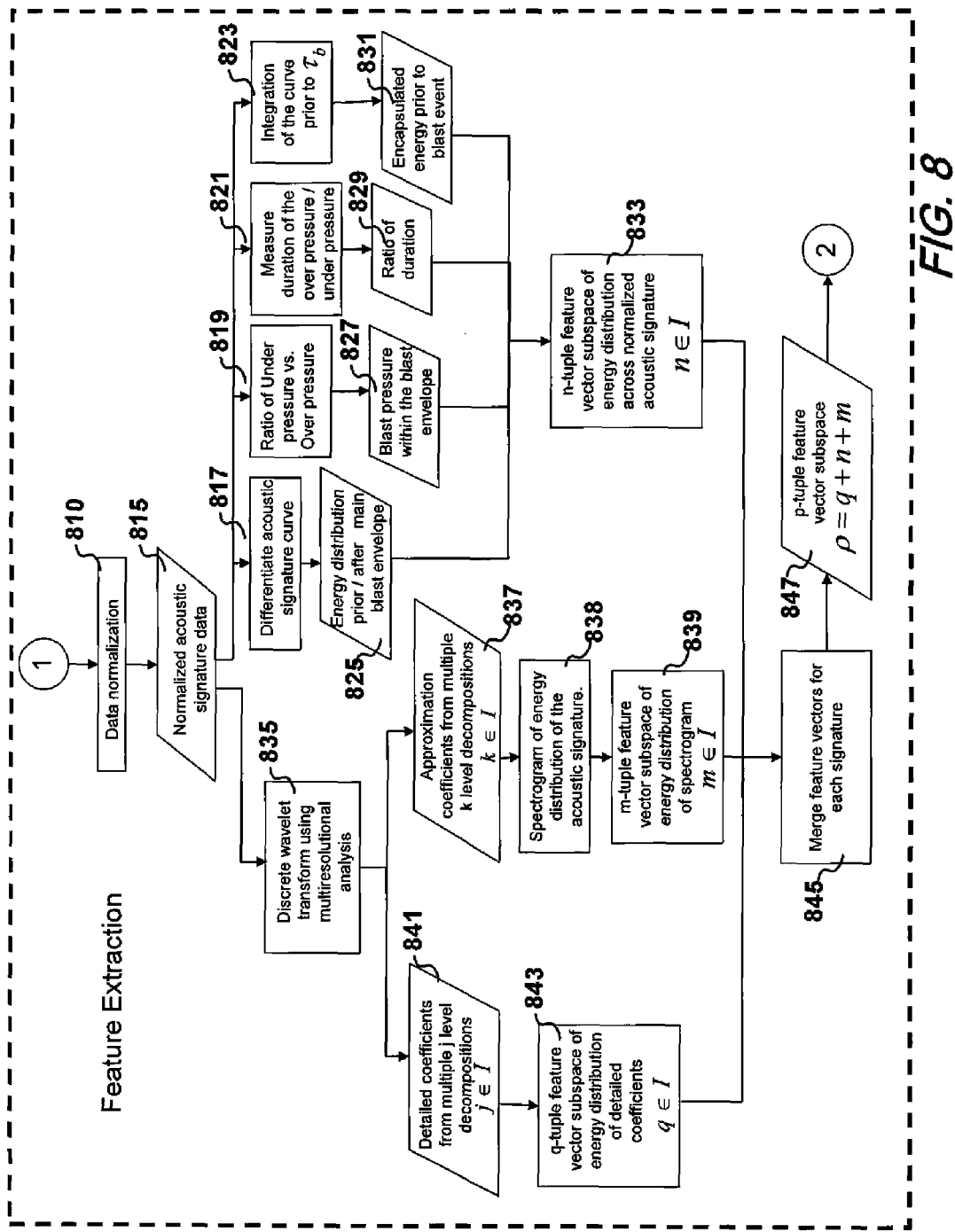
FIG. 8 is a flowchart showing feature extraction steps associated with a method according to the present disclosure.

Turning now to FIG. 8, there is shown a flowchart depicting the feature extraction of the signature data previously captured. The acoustic signature data previously captured is further preprocessed by first being normalized (step 810) resulting in a normalized set of acoustic signature data 815. As can be appreciated, this is based on the normalized signature without any wavelet utilization. More specifically, temporal domain is examined for feature extraction using a series of advanced signal processing techniques to determine the features.

More particularly, and following the data normalization, the acoustic signature data is applied to a discrete wavelet transform (step 835) that performs multi-resolution analysis on the signature data using a characteristic wavelet at level j, j∈I, (step 841) and k, k∈I, (step 837) whose attributes lend themselves to the analysis of our acoustic signature data with a single mother wavelet. Advantageously, the wavelet decomposition provides greater resolution of the baseband signal and the higher-level oscillatory harmonics associated with the acoustic signature for further analysis.

Preferably, and as can be appreciated by those skilled in the art, a number of steps of the present method may be performed in parallel with the above step. In particular (step 817) is performed in parallel with the above step whereby the curve that represents the normalized acoustic signature data is differentiated. Additionally, and further in parallel with the above step, the normalized acoustic data's maximum over pressure and under pressure of the main blast envelope are determined (step 819). Further in parallel, integration of the energy under the curve that represents the precursor events prior to the main blast found in the normalized acoustic signature data is performed (step 821).

Following step 835, primitives, collected after the after the multiresolutional analysis is performed—are used as detailed coefficients from multiple j level, j∈I, decompositions representing the oscillatory harmonics of the acoustic signature data from the artillery blast that holds some unique traits of the blast (step 841).

The primitives collected after the multiresolutional analysis is performed are the approximation coefficients from multiple k level, k∈I, (step 837) decompositions representing baseband information of the acoustic signature from the artillery blast provide distinctive information of the signature.

As indicated in step 825, the primitives collected after differentiating the curve representing the acoustic signature (step 817) provide distinctive information about the energy of the blast wave. The primitive collected by developing a ratio of the over pressure versus the under pressure of the blast describes the magnitude of the blast event and the dissipation of the blast energy (step 827).

The primitive collected by developing a ratio of the duration of the over pressure versus the under pressure classifies the magnitude of the overall blast event and resulting energy distribution (step 829).

The primitives collected by analyzing the energy distribution prior to the main blast event with calculated start and stop times are used to quantify the energy associated with potential shrapnel from the concussive nature of the projectile (step 831).

The oscillatory harmonics are the detailed components of the blast wave derived from multiresolutional analysis at j levels, j∈I, of the signature. This information is then a picture of the energy distribution of the signal at a given resolution denoted by level j (step 841). This is the information contained just prior to the max pressure of the blast and immediately after the max pressure of the blast. This information is summed into two elements prior to max pressure and after max pressure. The summed values are then associated with each other in the form of a ratio with summation for prior to the max pressure divided by the summation of the information just after the max pressure, the log of the ratio is taken and results in a q-tuple, q∈I, (step 843) feature space for each blast as we do this calculation for each level of interest.

The $k^{th}$ level, k∈I, baseband information is the approximation coefficients of the signal with a $k^{th}$ level, k∈I, resolution (step 837). Taking a spectrogram of the energy distribution and quantifying the values that exceed a certain threshold. (step 838) The results are stored in a m-tuple, m∈I, feature space for the blast as we do this calculation for each level of interest (step 839).

As may now be understood by those skilled in the art, the processes collectively describe the normalized acoustic data signature in terms of event duration and energy distribution. The first describes the energy around the main blast envelope, the second describes the ratio of maximum over pressure versus under pressure, the third illustrates the difference in duration of the two lobs defined by the zero crossing for the main blast event, and finally the energy of the precursor prior to the main blast event. These various processes result in four distinct values describing four distinct characteristics. The outputs of the signal result in a n-tuple, n∈I, feature space for each blast as we do this determination for each level of interest (step 833).

The q-tuple, q∈I, feature space resulting from the detail coefficients is combined with the m-tuple, m∈I, feature space resulting from the approximations, and combined with the n-tuple, n∈I, feature space resulting from the distribution of energy of the acoustic signature to from a single p-tuple, p=q+n+m, feature vector subspace (step 845), (step 847). The resulting processed signal information is stored for further analysis using a classifier.

Figure 9:
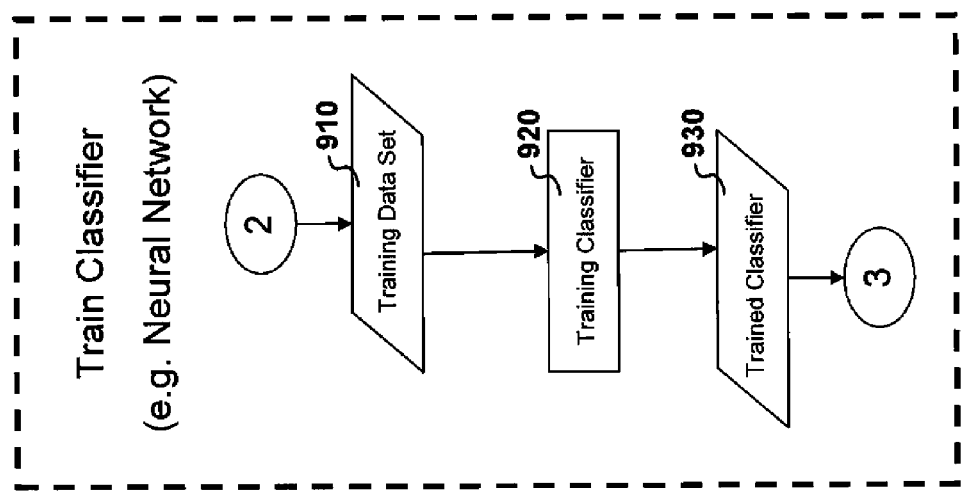
FIG. 9 is a flowchart showing classifier training steps associated with a method according to the present disclosure.

Turning now to FIG. 9, there is shown a flow chart outlining the steps of classifier training according to an aspect of the present invention. More particularly, training a data set involves the steps of: taking p-tuple, p=q+n+m, feature vector subspace from arbitrarily chosen acoustic signatures of artillery/mortar launches and impacts and creating a training data set of 50% Launch events and 50% Impact events and thereby creating a p×p, p=q+n+m, matrix of information to be used by the classifier, (e.g., neural network). (step 910).

A classifier (e.g., a standard multi-layer feedforward neural network), takes in the primitive features extracted from acoustic signatures of the artillery blasts in the form of a p-tuple, p=q+n+m, feature vector subspace describing the blast (step 920). Preferably, a pre-determined desired output is also inputted as is the learning rate and number of hidden layers to train the neural network. The result is a set of weights that describe the neural network and an output displaying if the presumptions made at the beginning of the training of the neural network hold up with the associated weights. Also outputted is the total error in the equation generated using the training data set. As a result, we now have a trained classifier to discriminate the artillery/mortar events (step 930).

Figure 10:
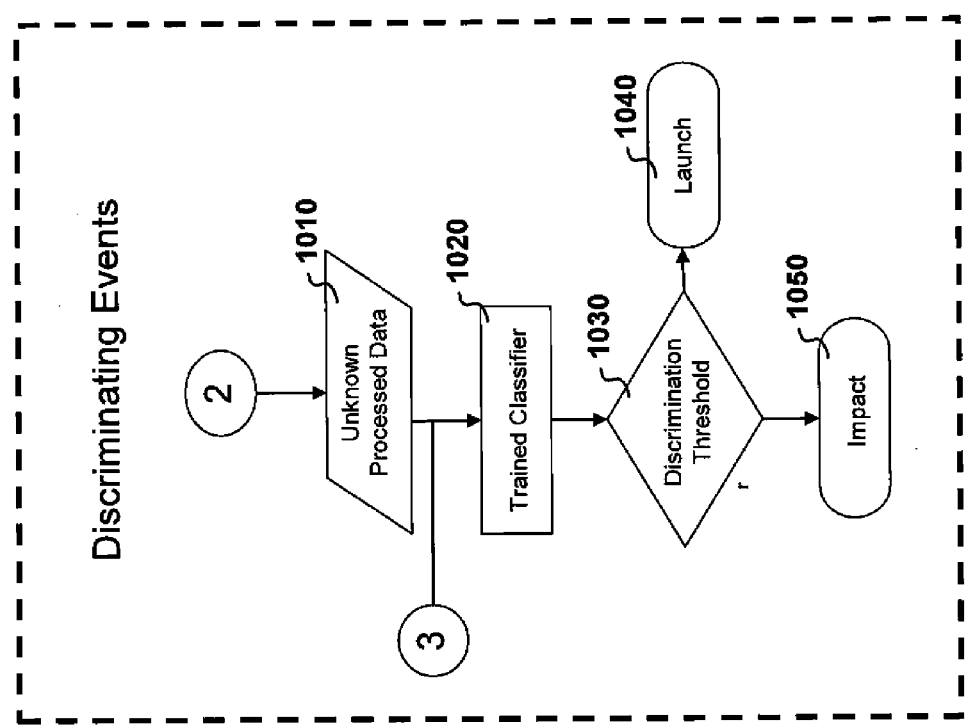
FIG. 10 is a flowchart showing general event discrimination steps associated with a method according to the present disclosure.

Turning now to FIG. 10, there is shown a flowchart depicting the steps associated with discriminating events according to an aspect of the present invention. At step 1010 unknown, processed data—which is merely acquired acoustic signature data of artillery/mortar events similar to the known training data and has been processed in exactly the same manner as the training data is acquired. To this data are applied the resulting weights from the training of the neural network results in a trained neural network. The unknown processed data is then tested against the trained neural network to produce an output for the sigmoid activation function.

When the output of the trained classifier (step 1020) is applied to a further decision making process a binary representation of an artillery blast as either Launch or Impact is made (step 1030), thereby allowing classification of the acoustic signature as either launch (step 1040) or impact (step 1050).

Figure 11:
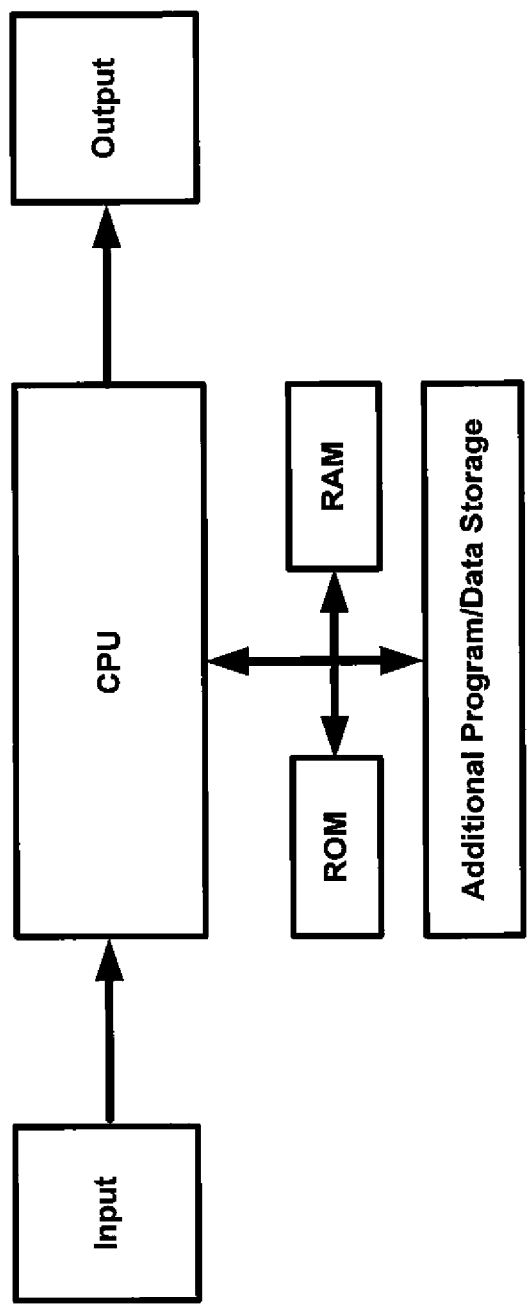
FIG. 11 is a block diagram of a representative computer system for executing the event discrimination method according to the present disclosure.

At this point, we may now describe the overall steps for explosive event discrimination using acoustic sensors according to an aspect of the present invention. Since this method is—in part—computational in nature it may advantageously be performed by a contemporary computer system comprising any of a variety of central processing units, memory, and input/output systems. Accordingly, the computer system will execute an operating program which may collect and process the acoustic data. Such a representative computer system is shown schematically in FIG. 11.

With the method and system in mind, the overall event discrimination method according to an aspect of the present invention may be readily understood and appreciated. First, an acoustic signature of an artillery detonation is detected/collected using an arbitrary acoustic sensor/transducer (not specifically shown) and received as input to the computer system of FIG. 11. The acoustic sensor detects the detonation and any acquired data is then recorded and stored. In a preferred embodiment—and not specifically shown, the acquired data is stored as a data element numbers in a designated file format as a data structure such that subsequent processing of the data can take place.

Next the collected/stored data is processed to extract any predominant components of the unique characteristics and create a p-tuple feature vector space. In a preferred embodiment, the data is preprocessed by normalizing the acoustic signature data. A discrete wavelet transform is then applied to the normalized acoustic signature which produces a wavelet decomposition.

The wavelet decomposition produces a set of details and approximations at levels k, k∈I, and j, j∈I by passing the data through a series of filters providing multi-resolution analysis of the signature creating a set of primitives. The primitives describe a distribution of energy during the duration of the main blast envelope by the detail coefficients of the blast event at level j, j∈I. Other primitives illustrate the energy distributed with the various frequencies encapsulating the blast event by approximation coefficients of the blast event at level k, k∈I. The final primitives used for the feature space are extracted from the normalized acoustic signature.

Utilizing the duration of the blast event, a distribution of the energy in the blast event is quantified (over-pressure, under-pressure) with regard to the duration of the event and precursors to the main blast event. These elements together produce a p-tuple, p=q+n+m, feature space that is stored as processed data that will be passed onto a classifier for further analysis in the next step.

Once the data is processed—classification power of a multi-layer feedforward neural network is used to process the characteristic feature space and help classify the signature. As can be appreciated, the processed data now has a set of p-tuple, p=n+m, feature vectors per signature. A set of these vectors—with no regard to the data—is arbitrarily selected and associated with a set of desired outputs between 0 and 1—where 0 is a launch explosive event and 1 is an impact explosive event. The sample set of p-tuple, p=q+n+m, feature vectors are used to train the neural network. After the neural network is trained a set of associated weights are produced.

With the classifier now trained using the sample set of data, we may now apply random sets of vectors from the processed signatures data sets. The data sets are classified as either a launch event or an impact event. Advantageously, our inventive method discriminates these events with a high confidence.

At this point, while we have discussed and described the invention using some specific examples, those skilled in the art will recognize that our teachings are not so limited. Accordingly, the invention should be only limited by the scope of the claims attached hereto.

The invention claimed is:

1. A computer implemented method for determining whether an explosive event is the result of a launch or an impact, which method utilizes only a single acoustic sensor, the method comprising the steps of:

collecting acoustic data resulting from the explosive event;

normalizing the acoustic data, which provides normalized acoustic signature data;

apply the normalized acoustic signature data to a discrete wavelet transform using a multiresolutional analysis, which provides detailed coefficients from multiple j level decompositions related to a blast wave, and approximation coefficients from multiple k level decompositions;

deriving a spectrogram of energy distribution from the approximation coefficients;

deriving a q-tuple feature vector space from the detailed coefficients;

deriving a m-tuple feature vector space from the spectrogram;

deriving a n-tuple feature vector space of energy distribution across normalized acoustic signature data;
combining the q-tuple, the m-tuple, and the n-tuple feature vector spaces to form a p-tuple feature vector subspace where p=q+n+m;
applying the p-tuple vector subspace to a trained classifier, to determine whether the explosive event was a launch event or an impact event; and
outputting an indication of the determination.

* * * * *